US007562071B2

(12) United States Patent
Dwork et al.

(10) Patent No.: US 7,562,071 B2
(45) Date of Patent: *Jul. 14, 2009

(54) EXPONENTIAL NOISE DISTRIBUTION TO OPTIMIZE DATABASE PRIVACY AND OUTPUT UTILITY

(75) Inventors: Cynthia Dwork, San Francisco, CA (US); Frank D. McSherry, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 443 days.

This patent is subject to a terminal disclaimer.

(21) Appl. No.: 11/292,884

(22) Filed: Dec. 2, 2005

(65) Prior Publication Data

US 2007/0130147 A1 Jun. 7, 2007

(51) Int. Cl.
*G06F 17/30* (2006.01)
(52) U.S. Cl. .............................. 707/3; 707/4
(58) Field of Classification Search ............ 707/1–10, 707/100–104.1, 200–205
See application file for complete search history.

(56) References Cited

U.S. PATENT DOCUMENTS

| 2003/0126139 A1* | 7/2003 | Lee et al. ............... 707/100 |
| 2005/0246391 A1* | 11/2005 | Gross ..................... 707/200 |
| 2006/0200431 A1* | 9/2006 | Dwork et al. ............ 706/12 |
| 2007/0124268 A1* | 5/2007 | Dwork et al. ............ 707/1 |
| 2007/0136027 A1* | 6/2007 | Dwork et al. ............ 702/180 |

OTHER PUBLICATIONS

Ben-Or, M., et al., "Completeness theorems for non-cryptographic fault-tolerant distributed computation," *ACM*, 1988, 1-10.
Blum, A., et al, "Practical privacy: The SuLQ framework," *PODS*, 2005, 128-138.
Chawla, S., et al., "On the utility of privacy-preserving histograms," *UAI*, 2005, 120-127.
Chawla, S., et al., "Toward privacy in public databases," *Theory of Cryptography Conference*, 2005, 363-385.
Dwork, et al., "Privacy-preserving datamining in vertically partitioned databases," *Crypto*, 2004, 17 pages.
Goldreich, O., et al., "How to play any mental game," *ACM*, 1987, 218-229.
Killian, J., "Secure Computation," *Cryptography Tutorial*, http://www.cs.rutgers.edu/~jkilian/lectures, downloaded from the Internet on Feb. 27, 2006.
U.S. Appl. No. 11/244,800, filed Oct. 6, 2005, Dwork, et al.
U.S. Appl. No. 11/291,131, filed Nov. 30, 2005, Dwork, et al.
U.S. Appl. No. 11/298,563, filed Dec. 9, 2005, Dwork, et al.
U.S. Appl. No. 11/305,800, filed Dec. 16, 2005, Dwork, et al.
U.S. Appl. No. 11/316,761, filed Dec. 22, 2005, Dwork, et al.

* cited by examiner

*Primary Examiner*—Diane Mizrahi
(74) *Attorney, Agent, or Firm*—Woodcock Washburn LLP

(57) ABSTRACT

An amount of noise to add to a query output may be selected to preserve privacy of inputs while maximizing utility of the released output. Noise values can be distributed according to a substantially symmetric exponential density function ("exponential distribution"). That is, the most likely noise value can be zero, and noise values of increasing absolute value can decrease in probability according to the exponential function.

15 Claims, 4 Drawing Sheets

Exponential Distribution

Hybrid Distribution

Substantially Exponential Distribution

US 7,562,071 B2

EXPONENTIAL NOISE DISTRIBUTION TO OPTIMIZE DATABASE PRIVACY AND OUTPUT UTILITY

BACKGROUND

Data collection is used to gather information for a wide variety of academic, business, and government purposes. For example, data collection is necessary for sociological studies, market research, and in the census. To maximize the utility of collected data, all data can be amassed and made available for analysis without any privacy controls. Of course, most people and organizations ("privacy principals") are unwilling to disclose all data, especially in modern times when data is easily exchanged and could fall into the wrong hands. Privacy guarantees can improve the willingness of privacy principals to contribute their data, as well as reduce fraud, identity theft, extortion, and other problems that can arise from sharing data without adequate privacy protection.

A method for preserving privacy is to compute collective results of queries performed over collected data, and disclose such collective results without disclosing the inputs of the participating privacy principals. For example, a medical database might be queried to determine how many people in the database are HIV positive. The total number of people that are HIV positive can be disclosed without disclosing the names of the individuals that are HIV positive. Useful data is thus extracted while ostensibly preserving the privacy of the principals to some extent.

However, as one might imagine, clever adversaries might apply a variety of techniques to predict or narrow down the set of individuals from the medical database who are likely to be HIV positive. For example, an adversary might run another query that asks how many people both have HIV and are not named John Smith. The adversary may then subtract the second query output from the first, and thereby learn the HIV status of John Smith without ever directly asking the database for a name of a privacy principal. With sensitive data, it is useful to provide verifiable privacy guarantees. For example, it would be useful to verifiably guarantee that nothing more can be gleaned about any specific privacy principal than was known at the outset.

Adding noise to a query output can enhance the privacy of the principals. Using the example above, some random number might be added to the disclosed number of HIV positive principals. The noise will decrease the accuracy of the disclosed output, but the corresponding gain in privacy may warrant this loss. The concept of adding noise to a query result to preserve the privacy of the principals is discussed in U.S. patent application Ser. No. 11/244,800 (attorney docket no. 314792.01/MSFT 5434); U.S. patent application Ser. No. 11/291,131 (attorney docket no. 314793.01/MSFT 5425); U.S. patent application Ser. No. 11/305,800 (attorney docket no. 314796.01/MSFT 5432); U.S. patent application Ser. No. 11/298,563 (attorney docket no. 314797.01/MSFT 5430), and U.S. patent application Ser. No. 11/316,761 (attorney docket no. 314798.01/MSFT 5431). Some additional work on privacy includes Chawla, Dwork, McSherry, Smith, and Wee, "Toward Privacy in Public Databases," Theory of Cryptography Conference, 2005; Dwork, Nissim, "Privacy-Preserving Data Mining in Vertically Partitioned Databases," Crypto 2004; Blum, Dwork, McSherry, Nissim, "Practical Privacy: The SuLQ Framework," PODS 2005; and Chawla, Dwork, McSherry, Talwar, "On the Utility of Privacy-Preserving Histograms," UAI 2005.

Even when noise is added to results, adversaries may be able to glean information about privacy principals by running a multitude of queries and comparing the outputs. This problem can be addressed by requiring that each of at most T queries of the data be a simple summation of the result of applying a fixed function to the data pertaining to each privacy principal, and queries beyond the $T^{th}$ are not answered.

In addition to the above, so-called secure function evaluation techniques, developed in the 1980's, were a major advance in the ability of people, organizations, or other entities ("privacy principals") to compute a collective result without disclosing their individual data to one another. Secure function evaluation is explored in a variety of academic publications. For a background discussion of secure function evaluation, please refer to Ben-Or, Goldwasser, and Wigderson, "Completeness Theorems for Non-Cryptographic Fault-Tolerant Distributed Computation" (1988), and/or Goldreich, Micali, and Wigderson, "How to Play Any Mental Game" (1987).

SUMMARY

In consideration of the above, the present invention provides systems and methods in which an amount of noise to add to a query output is selected to preserve privacy of inputs while maximizing utility of the released output. Noise values can be distributed according to a substantially symmetric exponential density function ("exponential function"). That is, the most likely noise value can be zero, and noise values of increasing absolute value can decrease in probability according to the exponential function. Advantages and features of the invention are described below.

BRIEF DESCRIPTION OF THE DRAWINGS

The systems and methods for selecting noise values from an exponential distribution to preserve privacy of inputs to a query while maximizing accuracy of outputs in accordance with the present invention are further described with reference to the accompanying drawings in which.

DETAILED DESCRIPTION

Figure 1:
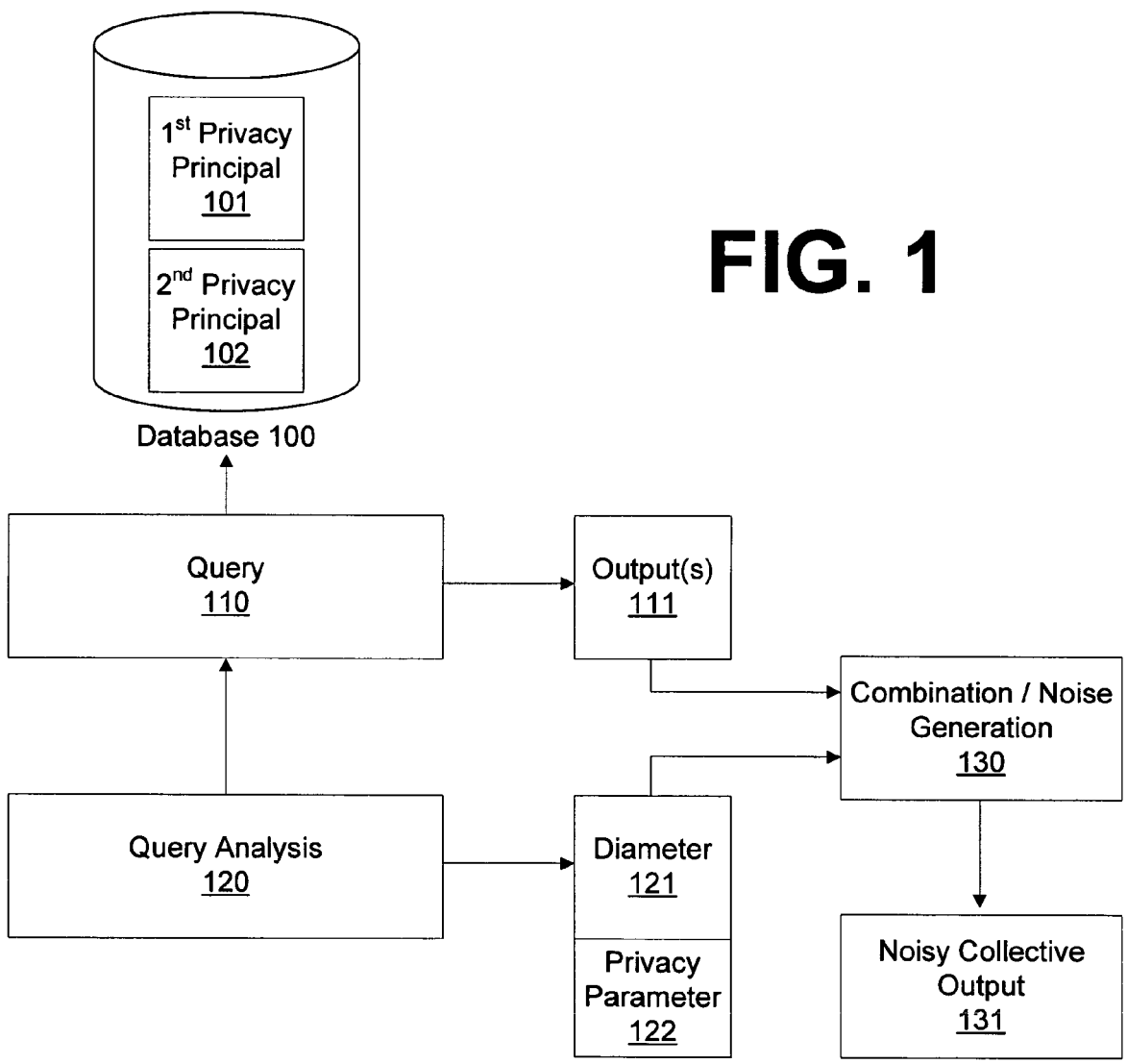
FIG. 1 illustrates a system for generating a noisy collective output, wherein said system preserves privacy of data used in calculating said noisy collective output.

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Results of Dwork and Nissim, "Privacy-Preserving Data Mining in Vertically Partitioned Databases," Crypto 2004 and Blum, Dwork, McSherry, and Nissim, "Practical Privacy: The SuLQ Framework," PODS 2005 (cited above) show a simple method for preserving privacy in an interactive statistical database. The database comprises input data in the form of a number of independent "rows". These may be anything— pictures, strings, sexual histories, medical records, etc.

In the simplest form, a query is a function that maps a row to a real number in the range [0,1]. We define the quantity obtained by applying the query function to each row and summing the results to be the "output". The privacy-preserving database mechanism, denoted "K" in honor of Alfred Kinsey, adds a certain type of noise to the output, and releases this noisy value. Three privacy-preserving distributions on noise were discussed in the above-mentioned papers. In particular, in Blum, Dwork, McSherry, and Nissim, "Practical Privacy: The SuLQ Framework," PODS 2005 it is shown that the amount of noise necessary for privacy depends only on the total number of queries to which any row in the database is exposed (in the presentation above, this is just the total number of queries to which the database responds, in its lifetime). We denote this bound T.

When possible noise values are distributed according to a Gaussian or binomial distribution (a "normal" distribution) this yields high output accuracy because the normal distribution approaches zero quite rapidly, and therefore the probability of large noise values is small. There is a potential failure mode, however, that leads to a small but non-zero probability that privacy can be compromised. Because the normal distribution approaches zero so rapidly, it can be more likely that an individual in the database, not a noise value, caused some perceivable anomaly in an output. This is especially true as the noise values that would be required to produce the perceived anomaly increase, because the likelihood of a large noise value becomes exceedingly small and it is therefore more likely that the anomaly was caused by input data.

For example, consider the situation introduced above in which a database contains medical information, specifically information regarding whether or not people in a particular neighborhood are HIV positive. An adversary may be interested in whether a particular person is HIV positive. If the adversary knows the likely average number of HIV positive people in the neighborhood, and released noisy query results indicate that the neighborhood is above average in that regard, it can be more likely that the particular person in question is HIV positive than that the released above average number was due to noise.

While using a substantially exponential noise distribution, defined below, somewhat increases the likelihood of selecting noise values of greater size, the resulting protection against privacy loss is absolute. That is, the exponential function approaches zero slowly enough that it becomes just as likely that noise caused some perceivable anomaly in an output, and nothing can be surmised about the individuals contributing input data to the database. The exponential noise distribution also minimizes the amount of noise, that is, it provides a uniquely advantageous balance between input privacy and output accuracy.

For large databases, the likely magnitude of noise added under an exponential distribution is not significantly larger than the magnitude under a normal distribution, since the noise is expected to be small compared to the true answer to the query. On the other hand, the absolute nature of the privacy guarantees achievable with an exponential noise distribution allows protection against a more powerful adversary; in particular, the adversary can specify its attack goals after interacting with a database, or can be interested in an arbitrarily large number of attack goals.

FIG. 1 illustrates a system configured to incorporate aspects of the invention. FIG. 1 is also presented in U.S. patent application Ser. No. 11/291,131, attorney docket number 314793.01 (MSFT 5425), which generally focused on systems and methods for calculating a diameter 121 of a query for use in generating a noise distribution. The techniques discussed therein are appropriate for use in combination with the exponential noise distributions discussed herein.

FIG. 1 provides a database 100 and a query mechanism 110 for performing queries on data therein. The data may be associated with privacy principals 101, 102, e.g. individuals, organizations, government agencies, and so forth. Query results can be summed to produce one or more outputs 111. Noise may then be added to output 111 in noise generation mechanism 130. The noisy collective output 131 is then released.

A database 100 is a collection of data, typically describing the activities of one or more related organizations, people, or other entities referred to herein as privacy principals. For example, a university database might contain information about entities, such as students, faculty, courses, and classrooms, and relationships between entities, such as student enrollment in courses, faculty teaching courses, and the use of rooms for courses. A database management system, or DBMS, is software designed to assist in maintaining and utilizing large collections of data. For the purpose of this document, however, the term "database," or "database server" refers to either or both of a collection of data and DBMS software. Thus, database 100 illustrates a database server comprising both collections of data and DBMS. Note that as such database 100 may include the various other elements presented in FIG. 1 which are illustrated separately to clearly suggest the operation of the invention.

Various DBMS products, e.g. MICROSOFT SQL SERVER®, IBM DB2®, ORACLE DATABASE®, and SYBASE IQ® have greatly extended the capabilities of databases. Databases can store a wide variety of data types, such as images and text, and can perform complex queries on stored data. Specialized systems have been developed by numerous vendors for creating data warehouses, consolidating data from several databases, and for carrying out specialized analysis. All such products and database configurations are suitable for use in connection with the systems and methods herein.

Noise generation mechanism 130 can select a noise value according to a distribution of noise values. A distribution of noise values provides the likelihood that any given value in the distribution will be selected.

Figure 2A:
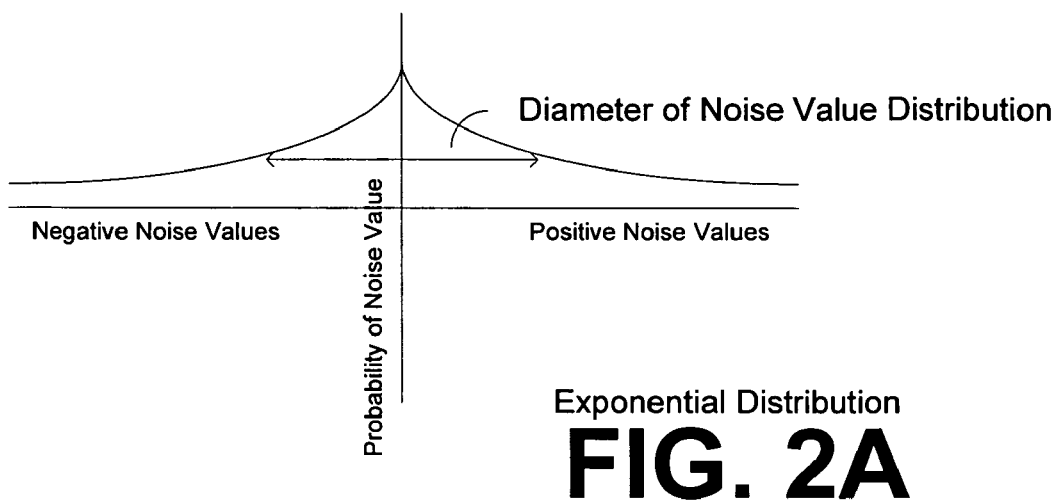
FIG. 2A illustrates an exponential distribution of possible noise values to add to an output.
Figure 2B:
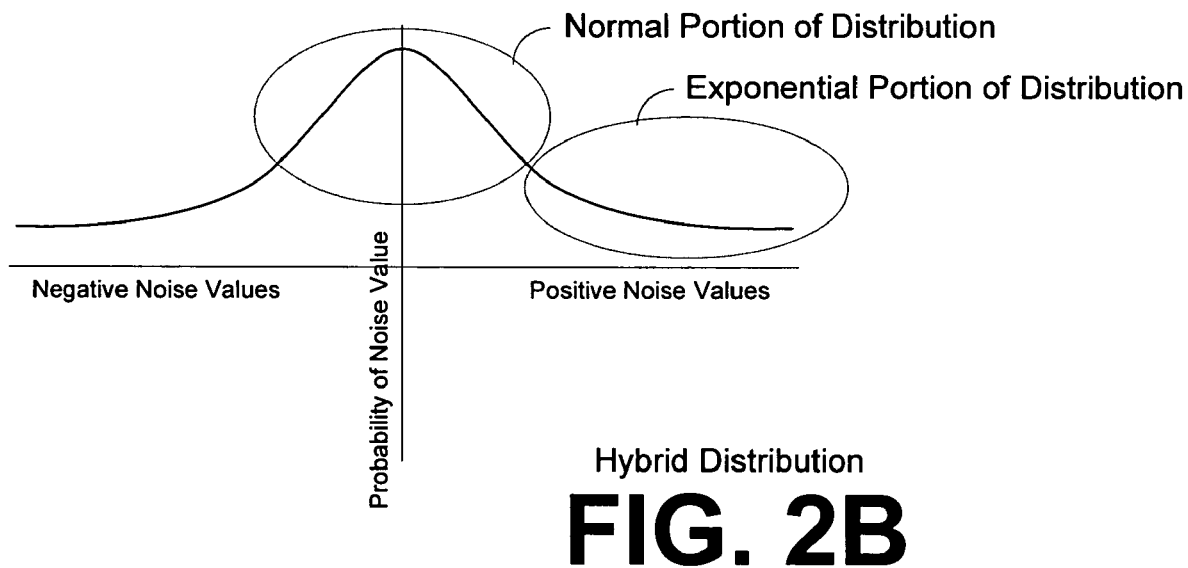
FIG. 2B illustrates a substantially exponential hybrid distribution of possible noise values to add to an output.
Figure 2C:
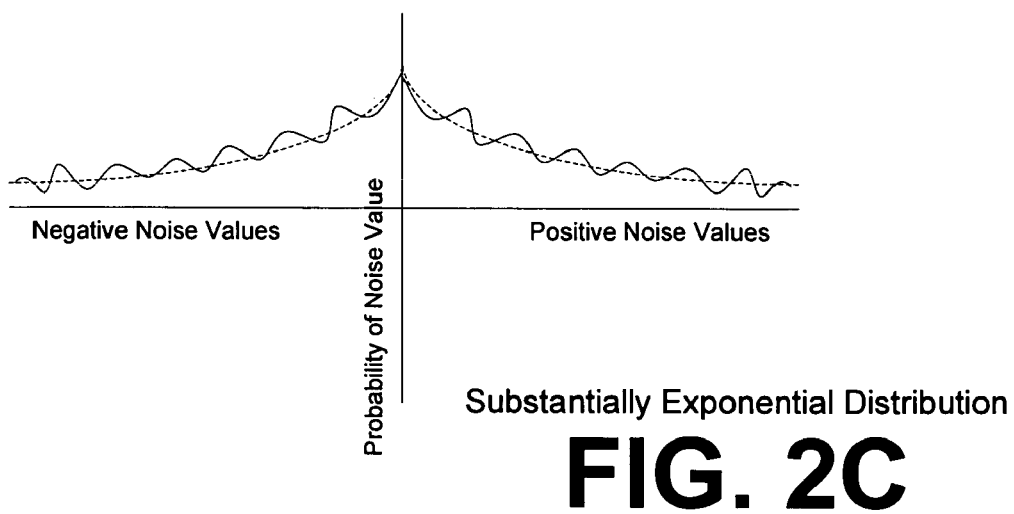
FIG. 2C illustrates another embodiment of a substantially exponential hybrid distribution of possible noise values to add to an output.

FIGS. 2A-2C illustrate a variety of substantially exponential distributions. In general, an exponential distribution may be generated according to a Laplacian distribution, with density function $q(x) = e^{\{-|X|/R\}}$, with $R > T/\epsilon$. Here T denotes the total number of queries to which the database will be exposed and $\epsilon$ is a parameter describing acceptable privacy loss, or change in confidence. The use of a privacy parameter in calculating a noise distribution is discussed in detail below.

FIGS. 2A-2C depict noise values along an x-axis, and probabilities associated with such noise values on a y-axis. Thus, a noise value on the x-axis corresponding to a high value on the y-axis has a high probability of being selected. The illustrated distributions all share a beneficial feature of decreasing the probability of selecting a given noise value as its absolute value increases. This feature allows noisy outputs to nonetheless be useful because the probability of an excessively high noise value can be remote.

FIG. 2A illustrates an exponential distribution, as will be recognized by those of skill in mathematics, and as referred to above. The term "substantially exponential distribution" is used herein to recognize the fact that noise may be distributed in a variety of ways that approximate the exponential distribution, but that are not exactly the exponential distribution. Any distribution that comprises portions that may be described or approximated using an exponential function is considered to be a substantially exponential distribution. For instance, hybrid distributions such as that depicted in FIG. 2B are possible.

FIG. 2B illustrates a distribution that is "normal" in the center, and becomes "exponential" as the noise values increase. Such a hybrid distribution uses a substantially exponential distribution in accordance with embodiments of the invention. This particular hybrid distribution may be useful in some scenarios, because it concentrates a greater probability of small noise values under a normal distribution, but then uses an exponential distribution for the lower-probability areas. The probability of small noise values is high, but the probability of larger noise values does not approach zero as fast as it would under the normal distribution.

FIG. 2C also represents a hybrid distribution that is considered substantially exponential for our purposes. Here, a distribution is depicted that is not strictly exponential, but nonetheless follows a substantially exponential contour as can be see by the dotted line representing an exponential distribution.

Returning to FIG. 1, a system such as the illustrated system, and in particular a noise generation mechanism 130 may select a noise value to add (or subtract) from an output based on the substantially exponential distributions illustrated in FIG. 2A-2C.

The precise exponential distribution used may be calculated using a query diameter measurement, as described in U.S. patent application Ser. No. 11/291,131, attorney docket number 314793.01 (MSFT 5425). As described in that document, for any arbitrary query functions, the magnitude of noise values that are likely to be added to the collective outputs can be tailored to the query functions. We first view a collection of query functions as a single function, hereafter "f", which has multiple outputs. For each privacy principal "p" we can measure the diameter "diam" of their possible values under f: the maximum difference in f that can be attained by varying the data of the principal while holding the rest of the data constant.

$$\text{diam}(f, p) = \max\_\{x,y: x, y \text{ disagree only on } p\} \|f(x)-f(y)\|$$

Here we are measuring distance by looking at the size of $\|f(x)-f(y)\|$, and there are several possible ways to measure this quantity. For example, the following two exemplary measurements would be acceptable:

$$\text{diam1}(f, p) = \max\_\{x,y: x, y \text{ disagree only on } p\} \|f(x)-f(y)\|\_1$$

$$\text{diam2}(f, p) = \max\_\{x,y: x, y \text{ disagree only on } p\} \|f(x)-f(y)\|\_2^2$$

Knowing the diameter of a function f with respect to a principal p, we can ensure privacy simply by choosing to add exponentially distributed noise to the answer f(x) before returning it:

$$\text{noise} \sim \exp(-\epsilon \|x\|/\text{diam1}(f,p))$$

Here epsilon is a privacy parameter that determines an amount of privacy that is ensured. Note that in this embodiment, an epsilon of zero will correspond to zero privacy loss, but will also render the database useless because the amount of added noise becomes infinite.

A query analysis mechanism 120 determines a maximum difference in a collective output, or diameter 121 of a particular query. A query need not actually be run against the data in database 100 in order to analyze the query. Query analysis can proceed by analysis of the query itself, thereby determining the query diameter 121. Query analysis can be implemented in a plurality of acceptable ways.

In one embodiment, query analysis proceeds by finding a predetermined query diameter. For example, interested persons may analyze functions of interest, and publish papers proving bounds on their diameters. These functions with proven bounds will be used in conjunction with various implementations the invention. Query analysis mechanism 120 may thus match a query to a known diameter for said query.

In another embodiment, query analysis may recognize a query as from a set of related simple query functions for which query analysis algorithms are available. An appropriate algorithm may be applied to analyze the function and compute a diameter.

In other embodiments, diameter of a function may be determined empirically. As mentioned above, empirical diameter determinations are risky because they may result in inappropriately scaled noise distributions. Nonetheless, empirical diameter determinations may be appropriate in certain settings.

For example, in one embodiment, query analysis might actually take up a privacy principal 101 in database 100, save the initial state of the privacy principal 101, and then run a query against it a number of times, varying the data by altering it each time, to determine the query diameter. After testing to determine a diameter in this fashion, the privacy principal may be returned to its original state. In this embodiment, an actual collective output need not be calculated to determine query diameter. Instead it is simply known that outputs 111 can be combined to produce a collective output and that if they are, the diameter in said collective output from varying data associated with a privacy principal 101 can be used to generate an appropriate noise distribution for such a collective output.

In another embodiment, the query itself can be analyzed without the need to actually run the query or alter the data of a privacy principal 101. Instead, the diameter is determined by varying the data of a hypothetical first privacy principal. In effect, a hypothetical first privacy principal is constructed that would have a maximum impact on a collective result. While no actual data in a privacy principal is altered, this is described herein as varying the data of a first privacy principal, because the data of such hypothetical principal is "varied" to the point at which it will have maximum impact. Meanwhile, the data associated with one or more hypothetical second privacy principals is effectively held constant by the assumption that such data does not change when measuring diameter using the hypothetical first principal.

It should be noted that it is preferable to make diameter determinations with regard for all possible databases, not just one single actual database. The analytic approach for determining diameter can account for all databases.

A diameter measurement can be used in calculating each of the distributions in FIGS. 2A-2C. A large diameter value will widen the distribution, increasing the probability that larger x-axis (noise) values will be used. Conversely, a small diameter will decrease the likelihood of large noise values. The exemplary equations provided above are satisfactory, and those of skill in the art will be able to construct an infinite variety of distributions that successfully utilize a diameter measurement to create a satisfactory noise distribution. For example, an infinite number of small modifications to the distributions depicted in FIGS. 2A-2C are possible.

The mechanism for calculating a noise distribution 130 may be configured to modify a noise distribution using a privacy parameter 122, wherein said privacy parameter 122 corresponds to an amount of privacy that is ensured. We refer to the privacy parameter as ϵ. An ϵ that effectively widens the distributions illustrated in FIG. 2A-2C will provide enhanced security and vice-versa. In the equations set forth above, ϵ is contemplated to typically have a less than one in a denominator, with diameter in the numerator. Thus, a small value of ϵ leads to higher privacy. Any number of other ways to implement a privacy parameter are available to the skilled mathematician.

A system such as that illustrated in FIG. 1 can be used to protect the privacy of any types of data. For example, the data may be medical information, and the privacy principals may be people. The data may also comprise information submitted to a government agency, such as the Internal Revenue Service (IRS), wherein the privacy principals could be private individuals, companies, and/or other organizations.

Figure 3:
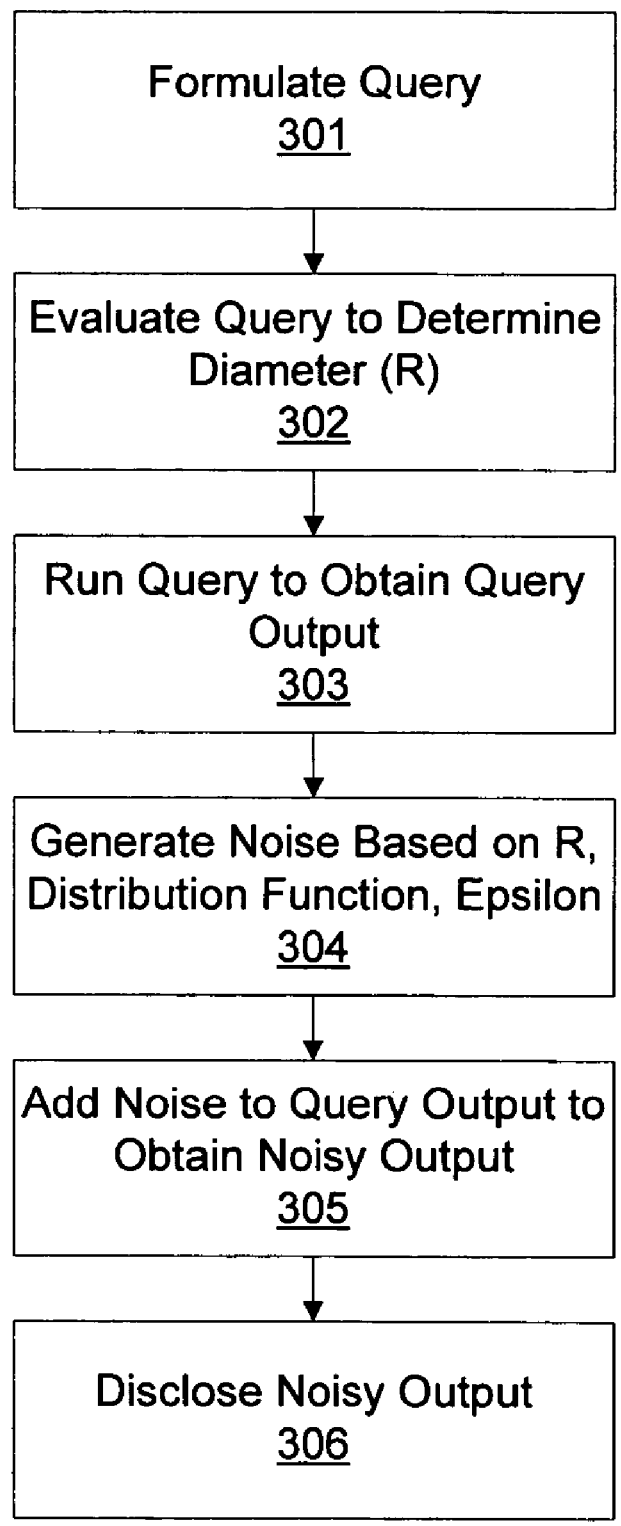
FIG. 3 illustrates a method for preserving privacy of data used in calculating an output.

With reference to FIG. 3, a method for preserving privacy of data used in calculating an output is illustrated. The method comprises first formulating whatever query is to be run against data in a database 301. Next, the query can be evaluated to determine a diameter ("R") 302. The query can be performed on data associated with a plurality of privacy principals to obtain a plurality of outputs, and said plurality of outputs can be combined to produce a collective output. Evaluating the query 302 to determine a diameter comprises determining a maximum difference in said collective output from varying data associated with a first privacy principal while holding constant data associated with one or more second privacy principals, as explained above.

The query can be run in step 303, or this step may be postponed until after calculating an appropriate noise distribution in step 304. Calculating an appropriate noise distribution at step 304 comprises calculating using said diameter (maximum difference) a distribution of possible noise values to add to said collective output. The calculation may also make use of a privacy parameter that corresponds to an amount of privacy that is ensured. The calculation may contemplate any substantially exponential distribution curve, for example the exponential distribution in FIG. 2A, the hybrid distribution in FIG. 2B, or a hybrid distribution such as that of FIG. 2C.

Once a query is performed on said data associated with a plurality of privacy principals, the collective output from the query can be calculated, and a noise value from the calculated distribution can be added to the collective output to produce a noisy collective output 305. Finally, the collective noisy output can be disclosed at step 306, as can the noise distribution.

Figure 4:
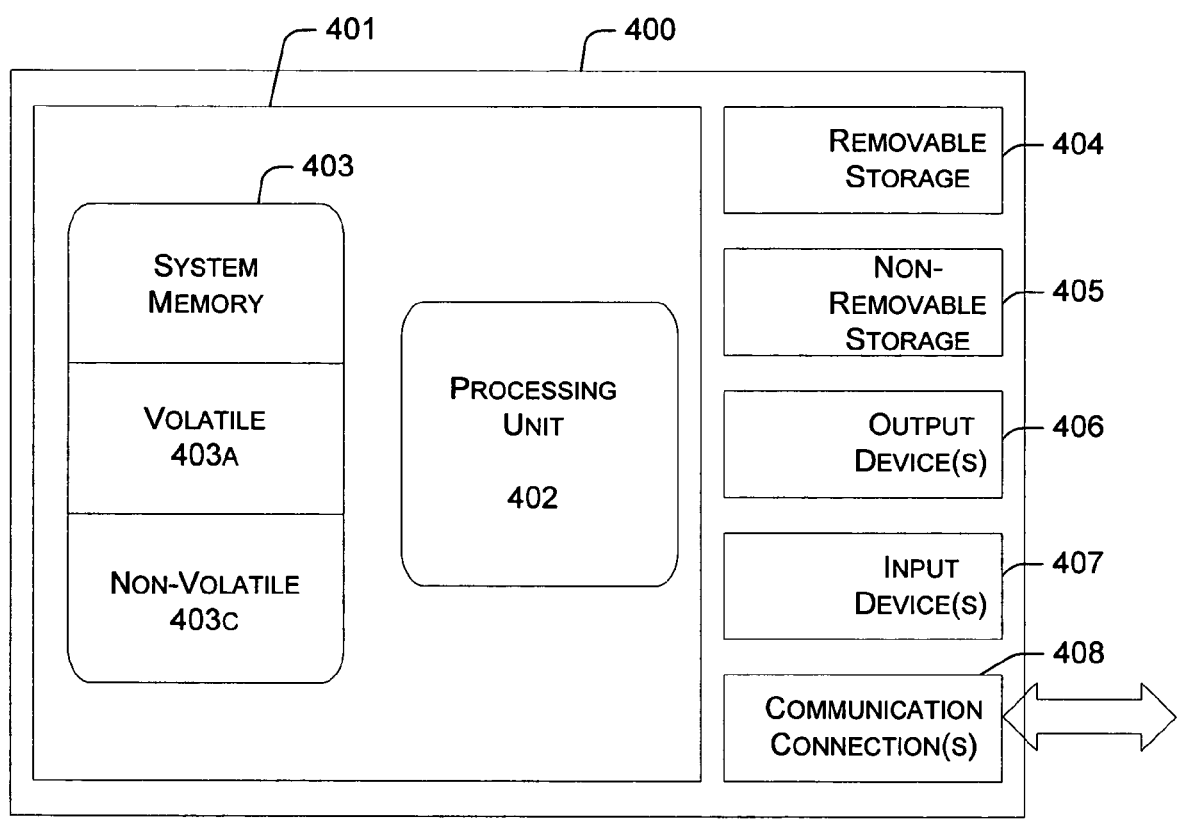
FIG. 4 illustrates general purpose computing device.

FIG. 4 presents a computing device 400 for use in conjunction with implementing the systems and methods contemplated herein. A database may generally comprise one or more computing devices, and devices may perform any of the various steps contemplated herein as will be appreciated by those of skill in the art. Computing device 400 typically includes at least some form of computer readable media. Computer readable media can be any available media that can be accessed by the computing device 400. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and that can accessed by the coputind device 400. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

Computing device 400 typically includes computer readable media in the form of system memory 403, either volatile 403A or nonvolatile 403C. Processing unit 402 executes instructions stored on computer readable media. Processing unit 402 and system memory 403 form the core 401 computing of device 400, which may further comprise additional functionality such as removable storage 404, non-removable storage 405, output devices 406, input devices 407, and communications connections 408. Such input/output devices and various aspects of computing are generally known in the art and need not be described in detail herein.

In addition to the specific implementations explicitly set forth herein, other aspects and implementations will be apparent to those skilled in the art from consideration of the specification disclosed herein. It is intended that the specification and illustrated implementations be considered as examples only, with a true scope and spirit of the following claims.

The invention claimed is:

1. A method for producing a noisy output that reduces predictability of data inputs while increasing accuracy of said noisy output, the method comprising:
    formulating a query against data associated with a plurality of privacy principals and stored in a database;
    evaluating the query to determine a query diameter measurement;
    performing the query on one or more data inputs;
    calculating by a computer processor an output of the query;
    calculating by a computer processor a substantially exponential distribution of noise values as a function of the query diameter measurement and a privacy parameter, the substantially exponential distribution being calculated according to a Laplacian distribution;
    combining by a computer processor said output with a noise value selected from the calculated substantially exponential distribution of noise values to produce the noisy output; and
    disclosing the noisy output.

2. The method of claim 1, wherein evaluating the query to determine the query diameter measurement comprises determining a maximum difference in the output from varying data associated with a first privacy principal while holding constant data associated with at least one second privacy principal.

3. The method of claim 1, further comprising revealing said substantially exponential distribution, and revealing said privacy parameter.

4. The method of claim 1, wherein said substantially exponential distribution comprises an exponential distribution.

5. The method of claim 1, wherein said substantially exponential distribution comprises a center portion defined by a normal distribution.

6. A computer storage medium having stored thereon computer executable instructions executed by a computer processor for producing a noisy output that reduces predictability of data inputs while increasing accuracy of said noisy output comprising:
   formulating a query against data associated with a plurality of privacy principals and stored in a database;
   evaluating the query to determine a query diameter measurement;
   performing the query on one or more data inputs;
   calculating an output of the query;
   calculating a substantially exponential distribution of noise values as a function of the query diameter measurement and a privacy parameter, the substantially exponential distribution being calculated according to a Laplacian distribution;
   combining said output with a noise value selected from the calculated substantially exponential distribution of noise values to produce the noisy output; and
   disclosing the noisy output.

7. The computer storage medium of claim 6, wherein evaluating the query to determine the query diameter measurement comprises determining a maximum difference in the output from varying data associated with a first privacy principal while holding constant data associated with at least one second privacy principal.

8. The computer storage medium of claim 6, wherein the instructions further comprise revealing said substantially exponential distribution, and revealing said privacy parameter.

9. The computer storage medium of claim 6, wherein said substantially exponential distribution comprises an exponential distribution.

10. The computer storage medium of claim 6, wherein said substantially exponential distribution comprises a center portion defined by a normal distribution.

11. A system for producing a noisy output that reduces predictability of data inputs while increasing accuracy of said noisy output, the system comprising:
   a computer processor; and
   a memory having stored therein instructions comprising:
      formulating a query against data associated with a plurality of privacy principals and stored in a database;
      evaluating the query to determine a query diameter measurement;
      performing the query on one or more data inputs;
      calculating an output of the query;
      calculating a substantially exponential distribution of noise values as a function of the query diameter measurement and a privacy parameter, the substantially exponential distribution being calculated according to a Laplacian distribution;
      combining said output with a noise value selected from the calculated substantially exponential distribution of noise values to produce the noisy output; and
      disclosing the noisy output.

12. The system of claim 11, wherein evaluating the query to determine the query diameter measurement comprises determining a maximum difference in the output from varying data associated with a first privacy principal while holding constant data associated with at least one second privacy principal.

13. The system of claim 11, wherein the instructions further comprise revealing said substantially exponential distribution, and revealing said privacy parameter.

14. The system of claim 11, wherein said substantially exponential distribution comprises an exponential distribution.

15. The system of claim 11, wherein said substantially exponential distribution comprises a center portion defined by a normal distribution.

* * * * *